(12) United States Patent
Fastlicht

(10) Patent No.: US 9,348,821 B2
(45) Date of Patent: May 24, 2016

(54) METHOD AND SYSTEM FOR CONTENT MANAGEMENT

(71) Applicant: Batzu Media, Inc., Beverly Hills, CA (US)

(72) Inventor: Michaelle Fastlicht, Los Angeles, CA (US)

(73) Assignee: Batzu Media, Inc., Beverly Hills, CA (US)

( * ) Notice: Subject to any disclaimer, the term of this patent is extended or adjusted under 35 U.S.C. 154(b) by 138 days.

(21) Appl. No.: 13/951,258

(22) Filed: Jul. 25, 2013

(65) Prior Publication Data

US 2014/0304247 A1     Oct. 9, 2014

Related U.S. Application Data

(60) Provisional application No. 61/809,219, filed on Apr. 5, 2013.

(51) Int. Cl.
*G06F 17/30* (2006.01)
(52) U.S. Cl.
CPC .... *G06F 17/30017* (2013.01); *G06F 17/30029* (2013.01); *G06F 17/30867* (2013.01)
(58) Field of Classification Search
CPC ............... G06F 17/30017; G06F 17/30029; G06F 17/30867
See application file for complete search history.

(56) References Cited

U.S. PATENT DOCUMENTS

| 6,297,824 | B1 | 10/2001 | Hearst et al. |
| 8,196,045 | B2 | 6/2012 | Chandratillake et al. |
| 2003/0217121 | A1 | 11/2003 | Willis |
| 2005/0114324 | A1* | 5/2005 | Mayer .............................. 707/3 |

(Continued)

OTHER PUBLICATIONS

PCT Search Report; Application No. PCT/US2014/022811 dated Jun. 30, 2014.

*Primary Examiner* — Tarek Chbouki
(74) *Attorney, Agent, or Firm* — Fox Rothschild LLP

(57) ABSTRACT

A computer-implemented method for content management includes receiving a text string from a user as a search term, sending the search term to a content aggregation server, receiving search results from a search term search executed by the content aggregation server the search results containing social network content from social network accounts of the user, content aggregation channel content, and search engine result content, where the social network content, content aggregation content and search engine content are derived from the search team, presenting the search results to the user along with filtering and channelization options, receiving filtering and channelization option configuration from the user, recording the filtering and channelization option configuration as a new content channel, and updating new content channel content by requesting re-execution of the search term search by the content aggregation site in response to a user access of the new content channel.

14 Claims, 6 Drawing Sheets

(56) References Cited

U.S. PATENT DOCUMENTS

| | | |
|---|---|---|
| 2006/0074864 A1 | 4/2006 | Naam et al. |
| 2008/0092051 A1 | 4/2008 | Sidon et al. |
| 2008/0282171 A1 | 11/2008 | Katz et al. |
| 2009/0019045 A1 | 1/2009 | Amir et al. |
| 2009/0234814 A1* | 9/2009 | Boerries et al. ............... 707/3 |
| 2010/0228693 A1 | 9/2010 | Dawson et al. |
| 2011/0022949 A1* | 1/2011 | Hallman et al. ............ 715/255 |
| 2011/0161409 A1 | 6/2011 | Nair et al. |
| 2011/0173214 A1* | 7/2011 | Karim ................. G06F 17/3002 707/754 |
| 2011/0289317 A1 | 11/2011 | Darapu et al. |
| 2012/0054166 A1 | 3/2012 | Jeremias |
| 2013/0014014 A1 | 1/2013 | Edwards et al. |
| 2014/0108374 A1* | 4/2014 | Dodge ............. G06F 17/30241 707/706 |

* cited by examiner

METHOD AND SYSTEM FOR CONTENT MANAGEMENT

CROSS-REFERENCE TO RELATED APPLICATION

The present application claims priority from U.S. Provisional Patent Application No. 61/809,219, filed on Apr. 5, 2013.

FIELD

The embodiments of the invention as illustrated and described herein are related to a content management process to enable individuals to create personalized content channels, specifically to create personalized content channels drawn from content obtained from search engines, social networks and other content channels.

BACKGROUND

Individuals consume content, in the form of articles, videos, music and similar media over the Internet in a variety of manners. However, the individual often has to spend a considerable time navigating multiple websites and similar media sources in order to find the content that is most interesting to them. This may not be a search that is focused such that a traditional search engine is useful in finding the content. Rather, users are interested in what is new and trending in relation to subjects that are of interest to them and particularly in relation to sources and content that their friends and family have been viewing. Some websites such as social networking websites allow individuals to share content with others within the social network, but the presentation is typically a link to another website and some minimal information about the content. Looking only at content that has been shared provides a limited and incomplete picture of the content that may be relevant to the individual.

Aggregation websites attempt to provide a consolidated presentation of news articles from multiple news websites. However, these aggregation sites do not provide content from other sources and they are categorized broadly into such categories as politics, sports and similar broad categories. The individual may have more specific interests than such broad categories and have to navigate through content that they are uninterested in to find relevant content. Also, with such broad categories the aggregation site cannot present all of the possible content for the category. The individual may not find the specific content they are most interested.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1A:
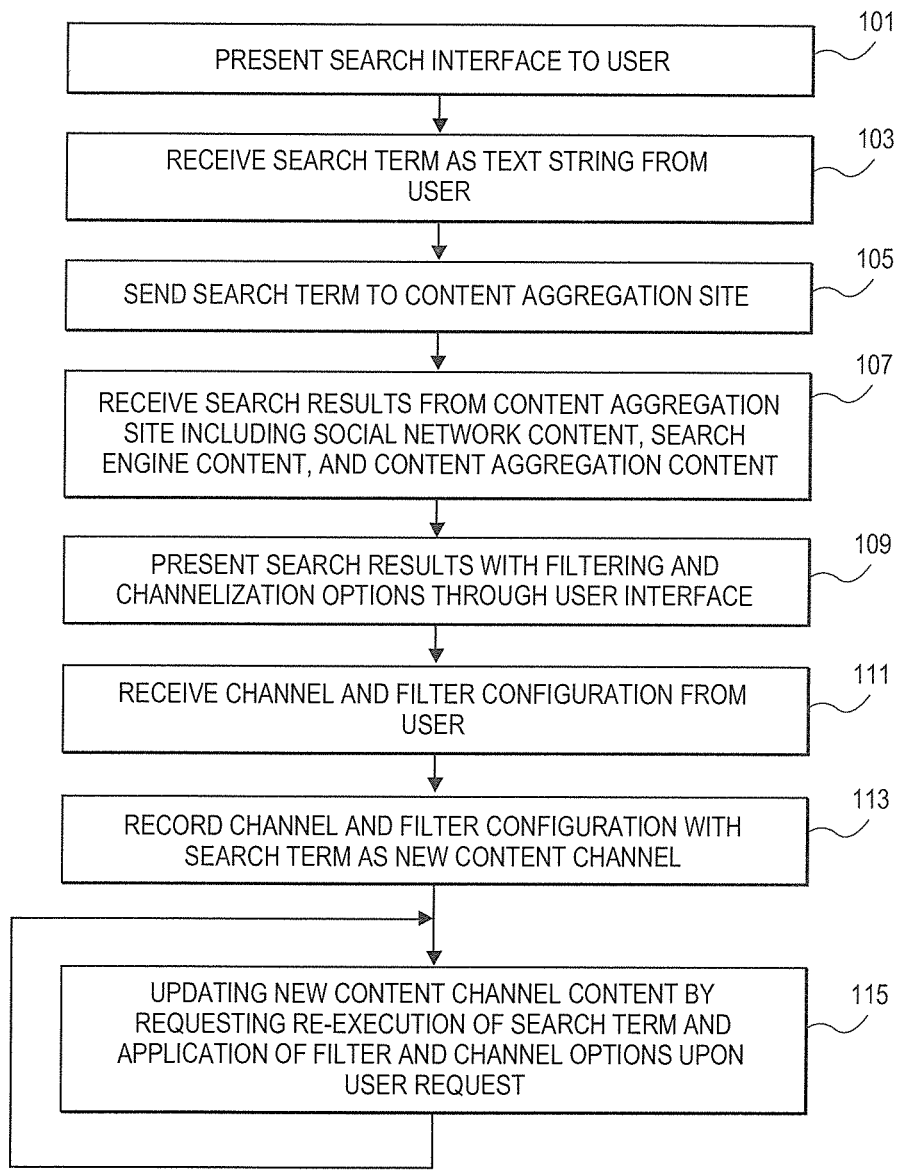
FIG. 1A is a flowchart of one embodiment of a focused content aggregation process.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations depicted in the flow diagrams in the attached Figures will be described with reference to the exemplary embodiments shown in the attached Figures. However, it should be understood that the operations depicted in the flow diagrams can be performed by embodiments of the invention other than those discussed with reference to the attached Figures, and the embodiments discussed with reference to the diagrams in the attached Figures can perform operations different than those discussed with reference to the flow diagrams of the attached Figures.

The techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices, user input/output devices (e.g., a keyboard, a touch screen, and/or a display), and network connections. A 'set,' as used herein, refers to any positive whole number of items. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). A server, as used herein, is a computing device having any number of processing elements, memory devices, storage devices, networking elements and similar components that function to offer a resource or service to local or remote computing devices. A remote computing device is a computing device connected to the server over a wide area network. A local computing device is a computing device connected to the server over a local area network or directly connected to the server with a point to point link. The terms "function" and "procedure" are used herein interchangeably and generally refer to a computer-implemented process defined in a computer program.

FIG. 1A is a flowchart of one embodiment of a focused content aggregation process. In one embodiment, the process is initiated by a user accessing the search interface of a media presentation application, browser or similar application. The user can initiate a search via a search interface that is presented by the application (Block 101). The application can be executed by a user device, such as a personal computer, tablet, phone, or similar device. The search interface is generated by a client device application such as a channel browser or general purpose browser. The search interface can be a text box or similar interface mechanism capable of receiving text input from a user. The user can use any input device or peripheral to input a search term that can be a string of any length (Block 103). The search term can be processed at the completion of the input process or during the input process to provide a listing of suggested search terms that are similar to the search term being entered by the user. The listing of suggested search terms can be drawn from a dictionary, index or similar language reference.

In other embodiments, the suggested search terms are drawn from a listing, database or index of previously created content channels. A content channel as referred to herein, is a defined search including search terms, filters and other modifiers and optimizers that are applied in a defined sequence to retrieve content from any content source for presentation to the user and that can be intermittently updated to keep the content recent and reflect changes in the available content from the available sources. The content channel can have a label or name to allow reference to the content channel for purposes of selecting amongst defined content channels or sharing the content channel with other users. The user can select a suggested search term or confirm the entered search term.

The search term input by the user is then sent to the content aggregation server (Block 105). The search term can be processed by the content aggregation server to compile content associated with the search term. This content is focused aggregated content that can include content from social networking sites, search engines, and/or previously defined focused content aggregation from the content aggregation server and similar content sources. The process for assembling this focused aggregated content is discussed further herein below. Focused aggregated content as referred to herein, is content that is aggregated from a plurality of sources including social networks, search engines, specific websites that host databases of articles, music or video and similar content sources. The content is 'focused' by use of user defined search terms and filters that are utilized to find and/or drop content from these sources.

The content aggregation site processes the search request and returns search results including social network content, search engine content, and content aggregation channel content (Block 107). This result data can be returned as a formatted webpage (e.g., with a magazine layout) or similar user interface to be presented to the user of the client device through a channel browser or general purpose browser. In other embodiments, the results are returned with a display template or template identifier for the client device to format the content that is received into the format of the template that is received with the content or stored locally. In further embodiments, the browser on the client device formats the received content without direction from the content aggregation site.

The client device browser (e.g., a specialized channel browser or a general purpose browser, the specialized channel browser can be a mobile application or similar application or 'app') can further modify the search results by applying filters or similar channelization options that are defined by the user though a user interface of the client device browser. The options can be presented through a user interface mechanism such as a radial menu, drop down menu, selectable buttons, sliders or similar user interface mechanisms. The filter types and channelization options can include filters based on content type (e.g., video, text, audio and similar content filter types), filters based on content subject matter (e.g., adult content filters, key word inclusion or exclusion and similar subject matter filters), filters based on sources (e.g., inclusion or exclusion of domains and similar source based filters) and similar filters and channelization options. Channelization options can also include preferences on content layout by selecting from a set of available templates, content ordering (e.g., newest first, particular source first or similar ordering), content sizing and synopsis length and similar presentation options.

The user can select any combination or number of filters and channelization options that are recorded as a channel configuration (Block 111). The filters and options can be dynamically applied to the results of the search that are presented to the user to allow the user to view the results of the current configuration before confirming the configuration. The search terms, filters and channelization options are recorded as a new channel for the user to access through the client device browser (e.g., a specialized channel browser, general purpose browser or similar client application) (Block 113). The user can access the new channel from a set of previously defined user channels as well as channels defined by the content aggregation site and other users. The set of available channels can be displayed in any format or order including icons or indicators that identify channels as user created, identity of user creator, whether new content is available since the last access and similar information.

Each time that a user accesses the channel, the search can be re-sent to the content aggregation site to obtain updated content and the filters and channelization options reapplied (Block 115). Similarly, the results can be placed into the defined template or received already formatted from the content aggregation site. The templates or the format provided by the content aggregation site can be a magazine style format with each search result shown as a navigation option including a synopsis of the content, an image or video, source information and similar data with a grid-like layout (e.g., a magazine layout), lead story section, flip or scroll page options and similar features.

Figure 1B:
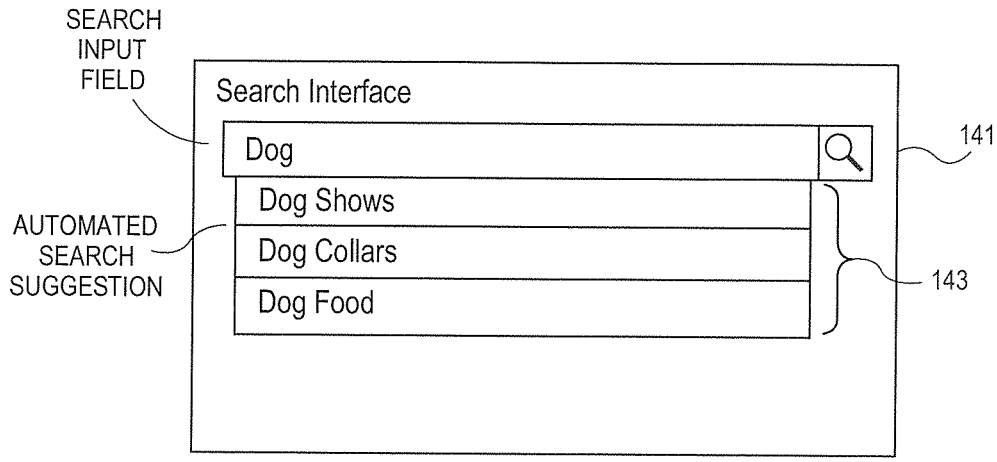
FIG. 1B is a diagram of one embodiment of a user search interface.

FIG. 1B is a diagram of one embodiment of a user search interface. In one embodiment, the client device browser provides a search interface as a text field 141 or similar interface mechanism. The user can use any text input method, including hardware keyboards, software (e.g., software keyboards, gesture inputs or similar input methods) or similar input methods to define a set of words to serve as a search term. During the input of the words, the interface can suggest completions of the search terms 143. These possible completions can be searched by the client device browser using a local index or by querying an index at the content aggregation site. The look up can utilize the partial input to continuously update the suggestions. In one embodiment, the suggestions are prior search terms or previously defined channel search terms. The previously defined channel search terms can include those maintained by the content aggregation site or can include those of other users.

Figure 1C:
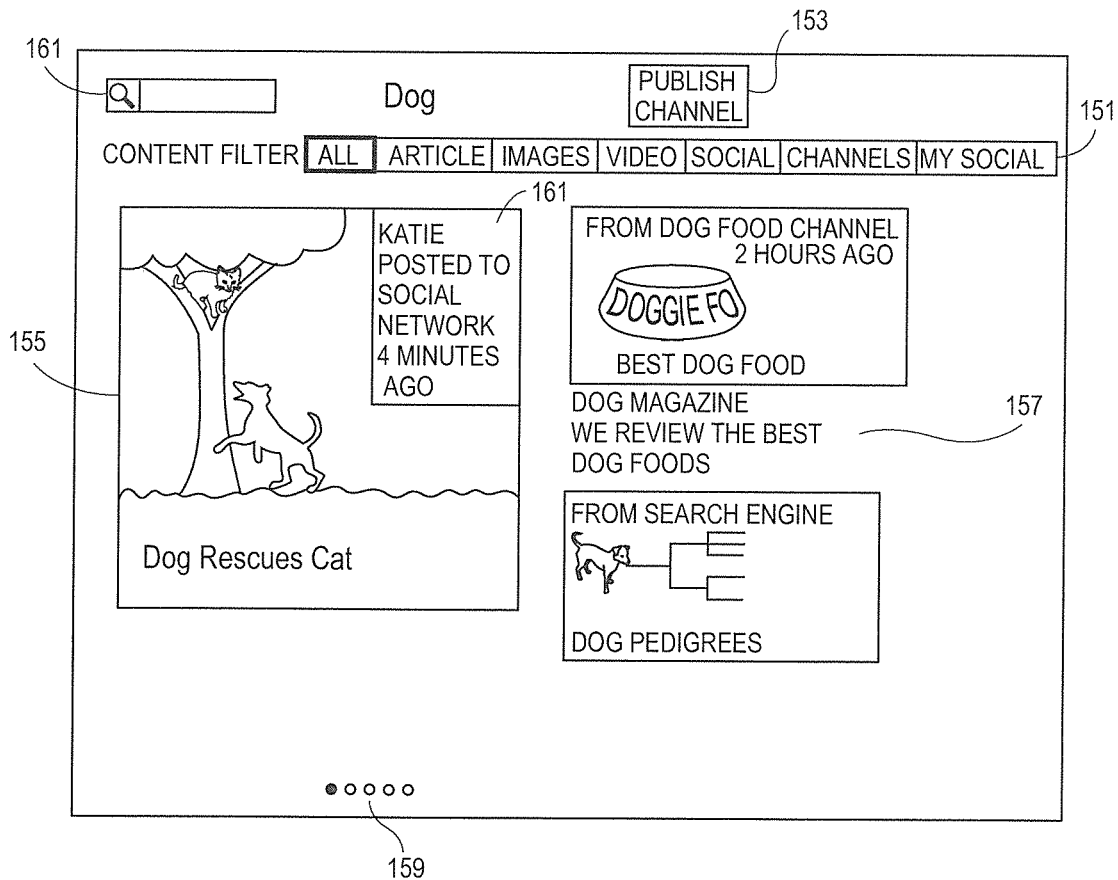
FIG. 1C is a diagram of one embodiment of a focused aggregated content presentation interface.

FIG. 1C is a diagram of one embodiment of a focused aggregated content presentation interface. The focused aggregation content presentation interface shows an initial view of a channel along with filter selection and channelization options. The content that is displayed for the 'dog' search term in this example includes a main content option 155, and a set of secondary content options. Each content option is selectable/navigable to enable viewing of the entire content such as the entire article, a full image, playback of a video or similar expansion of the content. The content option can be derived from the content using any mechanism either at the content aggregation site or at the client device. The content options are formatted using a specified template that determines the layout of the content options. In the illustrated example, the main content option 155 is a news article derived from a social network site because it was posted by a friend of the user. This information is indicated in an overlay 161 identifying the source and the friend. The age of the content option can also be indicated.

Some content options can be accompanied by a synopsis 157 that is derived from the content automatically. The synopsis can be taken from any portion of the content using any mechanism. The synopsis can have any size or format. Any number of content options can be displayed simultaneously and can be navigated by scrolling or by paging using gestures or similar input. A page indicator 159 can depict which page in the set of pages of content options the user is currently situated and viewing.

The filter and channelization options are illustrated at the top of the channel view, however, these options can be displayed at any location on the screen such that the do not obscure the content view. In the example, a search term input box 161 and a content type filter 151 are shown. The content type filter 151 is presented as a button menu 151. Any number or variety of additional filter types and channelization options can be displayed. When the user has completed the configuration of the channel, then the user can select the add channel button 153. This option saves the configuration and makes the channel available for further viewing from a selection screen within the client device browser. The channel can also be reported to the content aggregation site. The content aggregation site can maintain current search results for the channel or offer the channel to other users.

In one embodiment, the channel is formatted using a magazine layout that includes formatting the search results by using images to represent each content item in the magazine layout, where the images are derived from each content item. Each content item is sorted by age, marked or read status and relevance for ordering in the magazine layout. The magazine layout includes multiple pages with each page corresponding to a separate channel including user defined channels, content aggregation site channels and channels defined by other users. The multiple pages can also be utilized to provide additional content for any single channel that did not fit on the first page.

Figure 2:
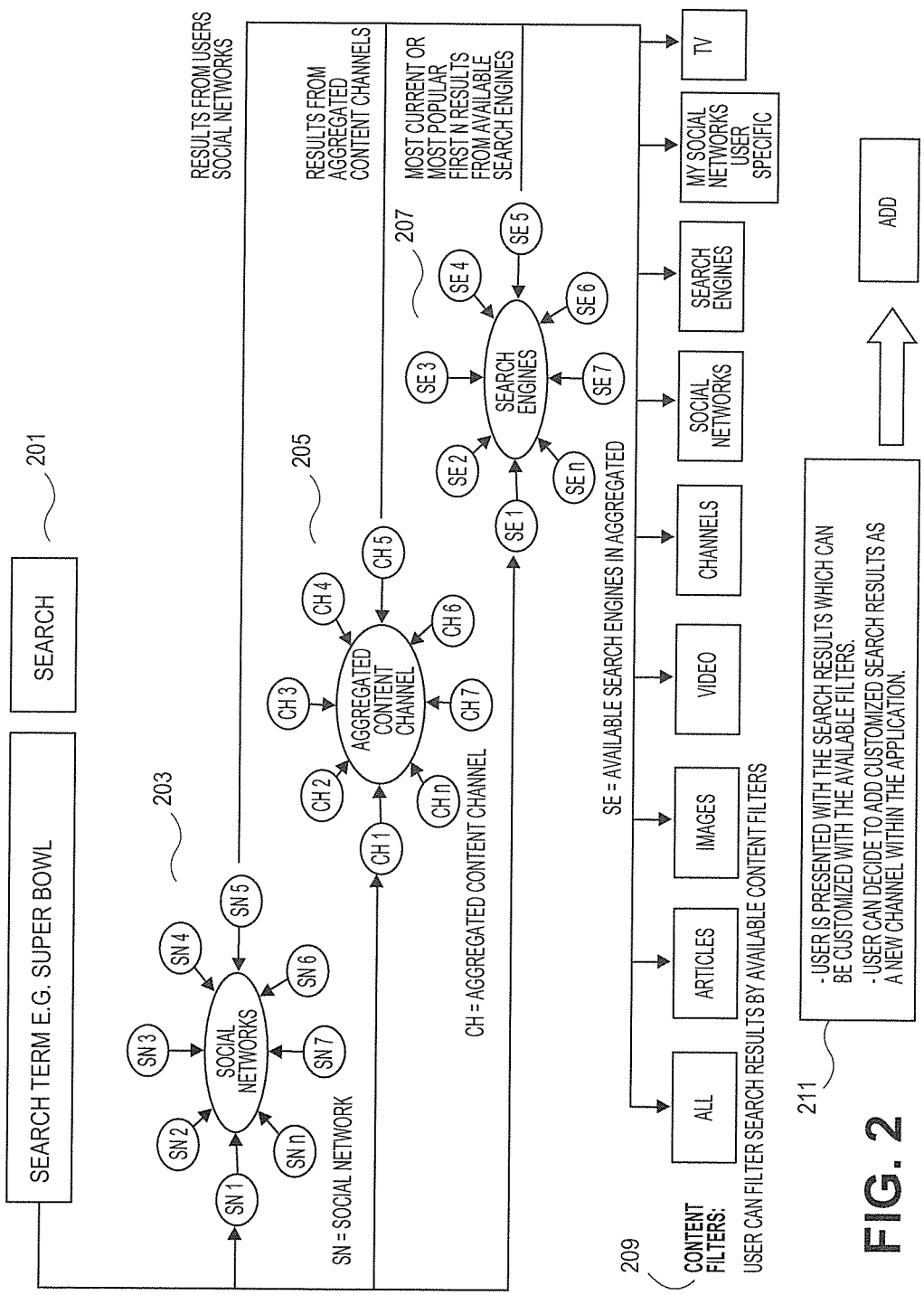
FIG. 2 is a diagram of one embodiment of a focused content aggregation process.

FIG. 2 is a diagram of one embodiment of a focused content aggregation process. This process illustrates the focused aggregation process. The process begins at 201 with the entry by a user of the search term. This search term is then provided to the content aggregation site which searches a set of databases that are aggregations of data from social networks 203, previously defined aggregated content channels 205, and from search engines 207. This data can be maintained in a database by periodic update or traversal of the relevant sites or by real-time queries. Search engines for example are likely to be queried in real-time with the received search term for a new channel. For existing channels, the query can be run periodically and cached in the database to provide as part of the search term results to the client devices.

Filters are applied to the initial results from the search of the various content databases and sources at 209. The filters are defined on a channel by channel basis. The filter can be defined by a user for a user defined channel of by the content aggregation site for content aggregation site channels. Additional optimizations and options can be applied in addition to filters as configured by users. The filtering and the optimizations can be done at either the content aggregation site or at the client device or any combination thereof. In addition, the final content is formatted into a template or similar layout into a magazine style or similar interface before being presented to the user. In the case of a new search term, the user can refine the results with filters and channelization options and finalize the result as a new channel at 211.

Content filters 209 can include filters that restrict results to articles, images, videos, defined channel content, social network sources, search engine sources, user specific social network sources and similar filters. Defined channel content can be content from existing channels defined by the content aggregation site, the user or other users. User specific social network sources can restrict social network sourced information to that derived solely from the friends of the user in at least one social network.

Figure 3:
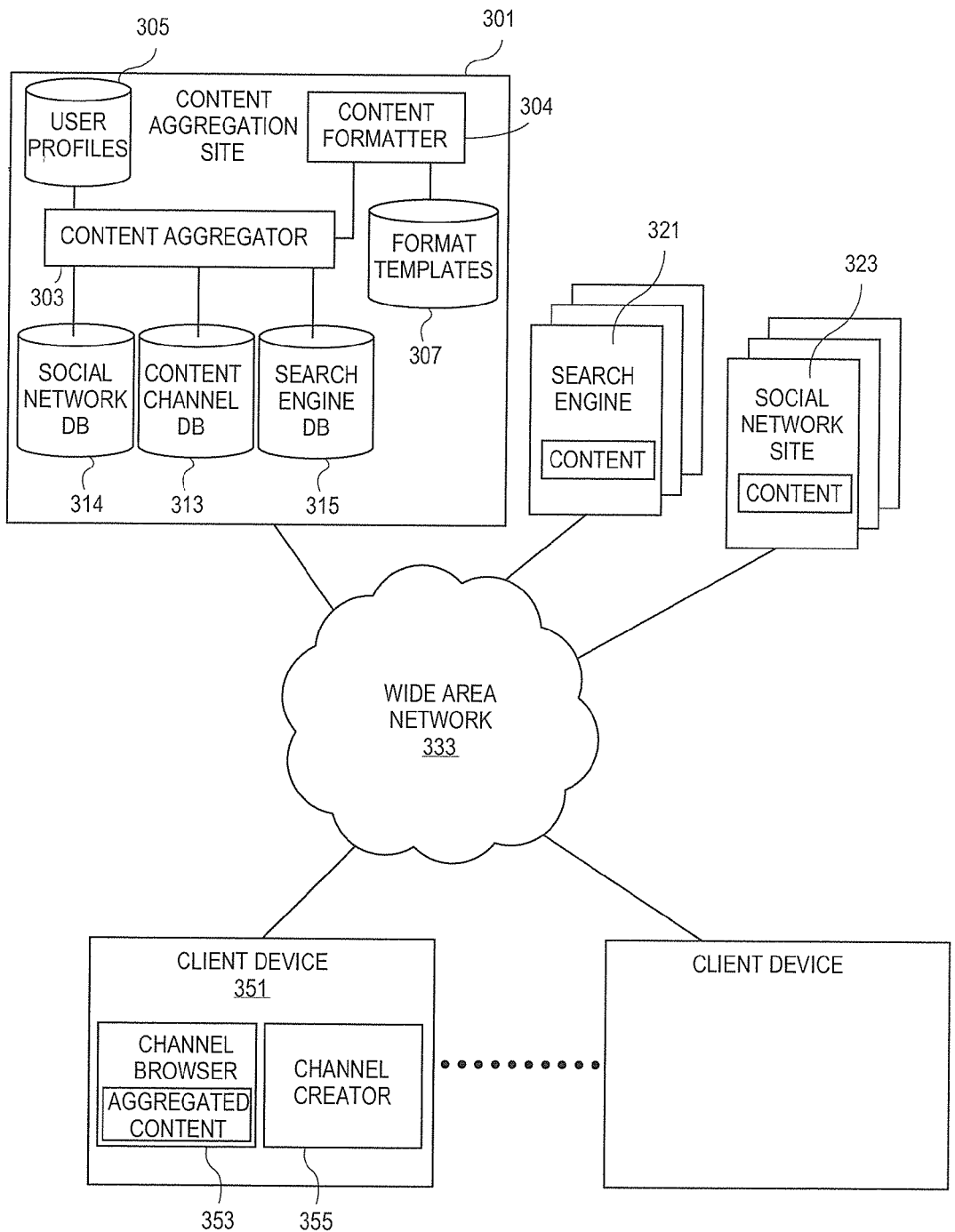
FIG. 3 is a diagram of one embodiment of a system for focused content aggregation.

FIG. 3 is a diagram of one embodiment of a system for focused content aggregation. In one embodiment, the system includes a content aggregation site 301 and a set of client devices 351 that communicate over a wide area network 333. In some embodiments, the content aggregation site 301 is a single server hosting the resources and processes of the content aggregation site. In other embodiments, the content aggregation site 301 is distributed over any number of servers that share the functions or spread the load amongst themselves. Such a set of distributed servers can be referred to as a "cloud" service. The set of distributed servers can be hosted by any entity and the set of distributed servers can host any number of other services and can be administered by the entity in control of the content aggregation site 301 or a third party. The set of content aggregation sites 301 can service any number of client devices 351 over the wide area network 333. In addition the set of content aggregation sites 301 can be in communication with any number of search engines 321, social network sites 323 and similar content sources. These search engines 321, social network sites 232, and other content sources can be remote from the content aggregation site 301 or hosted within the same set of distributed servers or cloud service.

The content aggregation site 301 can execute a content aggregator 303 that manages a set of databases and communication with the client devices 351. The content aggregator 303 can manage searching the local databases or querying external data sources to find content that matches the search terms provided by the client devices or corresponding to established channels. In one embodiment, the local databases can include a social networking database 311, a channel database 313, a search engine database 315, a format template database 307, a user profile database 305 and similar databases and data structures to track content and configuration for focused content aggregation.

A social networking database 311 can include content retrieved from social networking sites 323, such as image postings, shared articles, and similar content. This content can be periodically collected on a per user account basis or can be collected at the time that a channel that draws from social networking sources is updated. The content is retrieved by query, scraping, application program interfaces (APIs) and similar mechanisms and can leverage the user account information of a corresponding user. The content is collected to facilitate timely presentation and reformatting for the user. The content can be stored in the database to cache it for any length of time, for example for a few days until the content is considered stale or has been read and a defined amount of new content has been collected.

Similarly, a search engine database 315 can include content retrieved from search engines 321, such as images, articles, videos, webpages and similar content. This content can be periodically collected on a search term basis or can be collected at the time that a channel that draws from search engine sources is updated. The content is retrieved by querying any number of search engines and compiling most frequently returned results. The content is collected to facilitate timely presentation and reformatting for the user. The content can be stored in the database to cache it for any length of time, for example for a few days until the content is considered stale or has been read and a defined amount of new content has been collected.

A content channel database 313 can include content utilized in established channels defined by the content aggregation site or users of the content aggregation site. The content can include images, video, articles, and similar content. This content can be periodically collected on a per channel basis or can be collected at the time that a channel is updated. The content is retrieved by query, scraping, application program interfaces and similar mechanisms. The content can originate from the other databases or can be tied to established content providers that curate the channels, such as a news channel that is managed or fed by an established news organization. The content is collected to facilitate timely presentation and reformatting for the user. The content can be stored in the database to cache it for any length of time, for example for a few days until the content is considered stale or has been read and a defined amount of new content has been collected.

Other databases are related to the refining or personalization of channel data or the formatting of the channel data. A user profile database 305 can store user specific channel configuration information that defines filters and channelization options for each user defined channel. Storing the user profile in the user profile database 303 at the content aggregation site can facilitate the access to channels by a user in a device independent manner allowing the user to migrate between devices without losing the defined channels. In other embodiments, the content aggregation site does not maintain such a database, instead the user configuration information is maintained at the client device and applied by the browser.

In one embodiment, the content aggregation site includes a content formatter 309. The content formatter processes the content of the various content databases and creates navigable content options that can be inserted into templates or established layouts using the content in the databases. A standard template or layout can be utilized or specific templates or layouts for a particular channel can be defined and stored in a template database 307. These templates can have any configuration or layout and accommodate any arrangement and types of content.

A client device 351 can be any type of computing device including a desktop computer, laptop, mobile device (e.g., a tablet or smartphone), console device or similar device capable of executing a browser application. The browser application can be a specialized channel browser application 353 (e.g., a mobile app where the client device 351 is a mobile device) or similar application. In one example embodiment, the functions of the channel browser encompass the presentation of established channels to a user and the navigation thereof including the navigation of available channels and the navigation of the content of selected channels. The process of creating a channel can also be integrated into the browser. In other embodiments, a separate or companion application, e.g., a channel creator application 355, can be utilized to input search terms and customize channels including the specification of filters and channelization options. In further embodiments, the browser application is a thin client relying on the client aggregation site 301 to perform most functions related to preparing and presenting the channel content, for example where the client aggregation site 301 is implemented as a cloud service.

Figure 4:
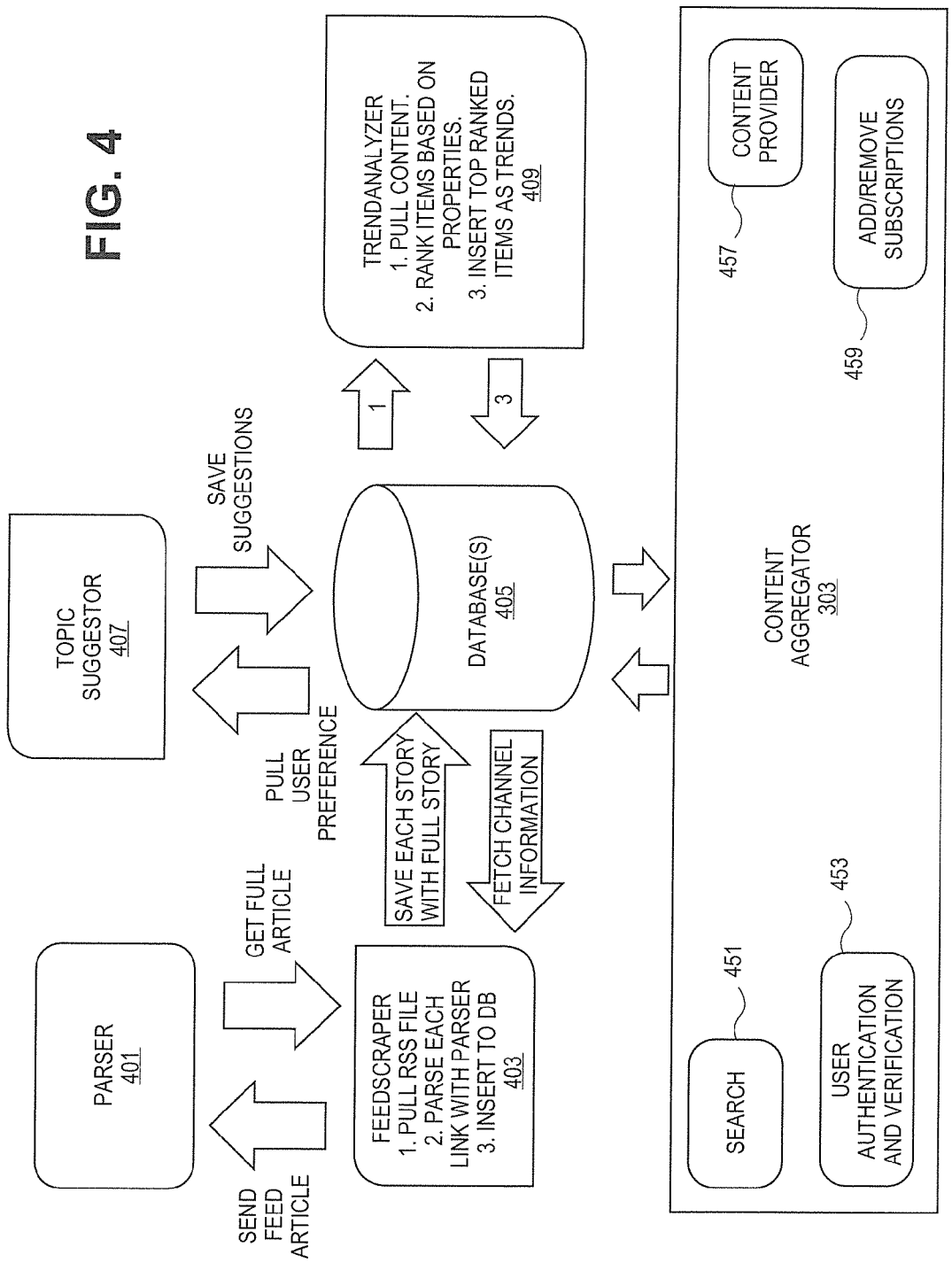
FIG. 4 is a diagram of one embodiment of the focused content aggregation server.

FIG. 4 is a diagram of one embodiment of the focused content aggregation server. In one example embodiment, the content aggregation server includes a content aggregator 303, parser 401, feedscraper 403, topic suggestor 407, trendanalyzer 409 and a set of databases 405. These components work in coordination to maintain the set of databases 409 described herein above and to service requests for content from the client devices. The content aggregator 303 can include a search module 451, user authentication and verification module 453, content provider module 457 and subscription addition/removal module 459.

The search module 451 can execute the search terms provided by the client devices. The search module 451 initiates the activities of the other modules be coordinating the initial search and establishing regular updates or triggering further updates for the search terms in conjunction with established channels. A user authentication and verification module 453 verifies a user of a client device for embodiments where the users each have separate accounts with the content aggregation site and the channels and content that are generated for each user are maintained privately. The authentication and verification module 453 can authenticate or verify using a username and password or similar methods. The content provider module 457 can return search results including formatted results to the client device. The content provider module 457 can coordinate the formatting of the results or receive the formatted results from a separate content formatting module. The subscription addition/removal module 459 can manage the user enrollment with the content aggregation service, established channel subscriptions and similar functions.

In one embodiment, each of the set of databases 405 can be populated by a parser 401 and feedscraper 403. The feedscraper 403 can pull any rich site summary (RSS) file for each website that is monitored for any channel, parse each link of the RSS and insert the link into the appropriate database. The feedscraper 403 can use other types of scraping including web and data scraping or using established APIs, e.g., social networking sites often provide APIs. Full articles or content items can be sent to a parser 401, which identifies information of interest within the content which can also be placed in the database or added to the entries made by the feedscraper 403. The parser 401 can identify information to be used for a synopsis, remove ancillary information or content (e.g., advertisements, banners or similar content) or similarly prepare the content for presentation in a channel.

A topic suggestor 407 can utilize partial or full search term queries to look up possible complete search terms or search terms that are tied to existing channels. The topic suggestor can pull prior search terms or existing channels from the set of databases and return possible suggestions to the content aggregator to be returned to the client device. In one embodiment, a trend analyzer 409 can look for search term and channel creation trends to be shown to users that may be interested in such trends. The trend analyzer can pull content from any of the set of databases 405, rank items based on a defined set of properties, and generate list of top ranked items as trends. The defined set of properties can be frequency over time, i.e., a frequently received search term over a given time period, or similar properties. The trend lists can be inserted into any content template for any channel or can be provided in a channel navigation screen.

Figure 5:
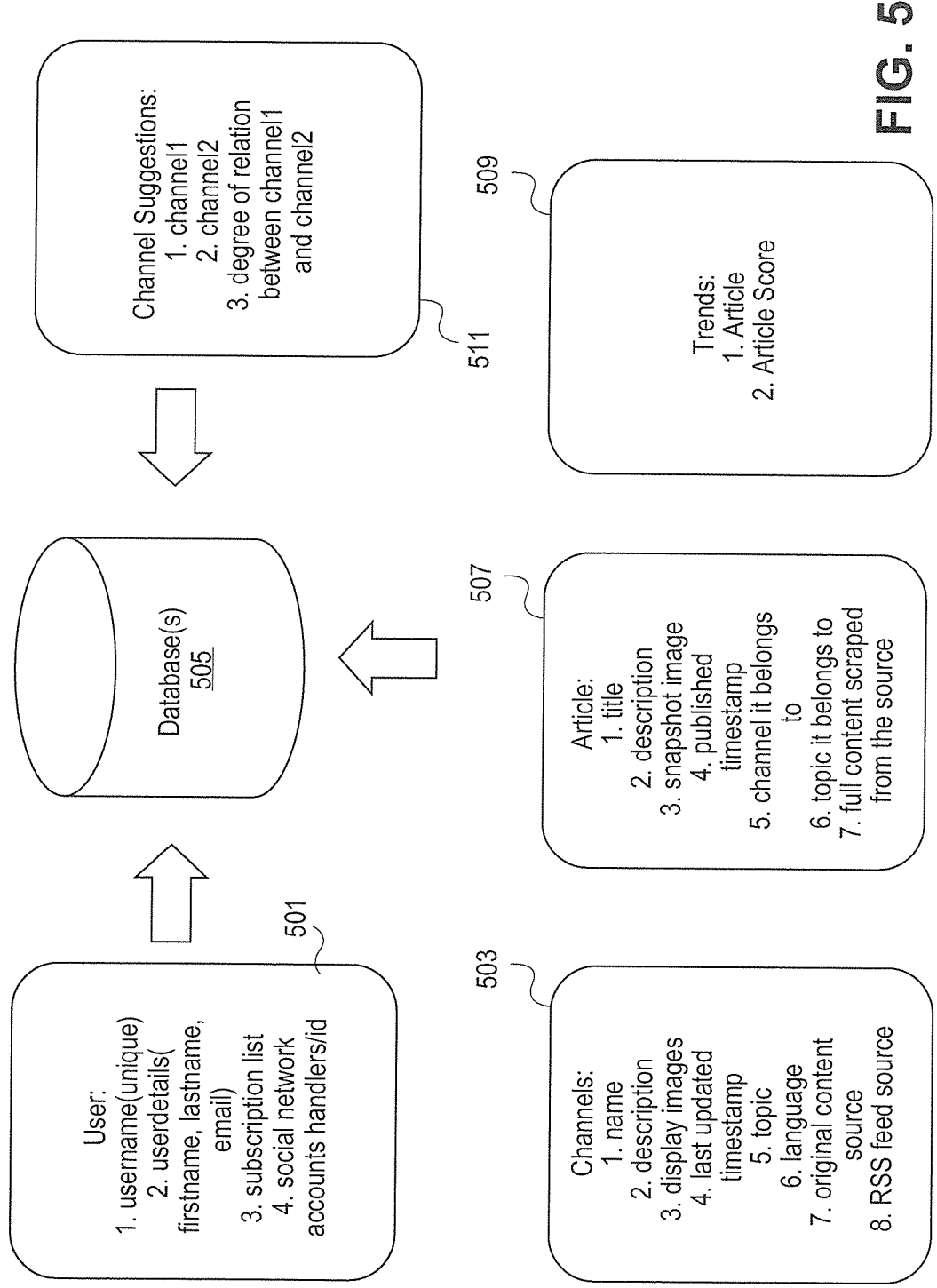
FIG. 5 is a diagram of one embodiment of a database structure for the focused content aggregation system.

FIG. 5 is a diagram of one embodiment of a database structure for the focused content aggregation system. The diagram provides an example organization of various types of content tracked by the set of databases in the content aggregation site. The databases can include user files 501, channels 503, articles 507, trend data 509, channel suggestion data 511 (e.g., a channel suggestion index) and similar data structures and data base records. These record types are provided by way of example, other types would be understood by those skilled in the art to have analogous structures.

A database of user files 501 can include records that track a (unique) username, user biographical information (name, email, etc.), user channel subscriptions, social network account information and similar data. A database of channels 503 can include records that track channel name, description, display images, last updated timestamp, topic, language, original content source identifier, RSS feed source and similar data. A database of article records 507 can include records that track a title, description, snapshot image, published timestamp, channel(s) an article belongs to, topic of the article, full content of article (as scraped from the source). A database or index of channel suggestions 511 can include records that track channel names and degrees of separation or relation between channels. A database of trends 509 can include records that track articles or other content, and an article or content score or rank.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "executing," "determining," "setting," "receiving," "distributing," "updating," "recording," "presenting," "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A computer-implemented method for content management presented via an application executed by a client computing device, the method comprising:

receiving a text string from a user of a media presentation application as a search term;

sending the search term to a content aggregation server;

receiving search results from a search term search executed by the content aggregation server, the search results containing social network content from social network accounts of the user, content aggregation channel content from one or more existing content channels of the media presentation application associated with the user, and search engine result content, where the social network content, content aggregation content and search engine content are derived from the search term;

presenting the search results to the user;

presenting one or more filtering and channelization options;

receiving a filtering and channelization option configuration from the user based on the filtering and channelization options;

applying the received filtering and channelization option configuration to the search results to identify a set of final content;

formatting the set of final content into a template;

recording the filtering and channelization option configuration as a new content channel that includes the set of final content;

presenting the new content channel to the user as a new page of the media presentation application that includes the set of final content formatted into the template, wherein each of the one or more existing content channels of the user are presented as different pages of the media presentation application; and updating automatically by the client computing device the final content by requesting re-execution of the search term search by the content aggregation server and re-applying the filtering and channelization option configuration to results of re-executing the search term in response to a user access via a channel browser navigation option for the new content channel.

2. The computer-implemented method of claim 1, wherein the social network content, content aggregation channel content, and search engine result content include articles, images and video.

3. The method of claim 1, wherein the filtering and channelization options include content type filters, subject matter filters, keyword filters, time filters and channel filters.

4. The method of claim 1, further comprising:

removing content from the search results defined by the filtering and channelization options.

5. The method of claim 1, wherein:

formatting the set of final content into a template comprises formatting the set of final content into a magazine layout on the new page using images to represent each content item in the magazine layout, where the images are derived from each content item.

6. The method of claim 5, wherein each content item is sorted by age, marked or read status and relevance for ordering in the magazine layout.

7. The method of claim 5, wherein each different page of the media presentation application is formatted into the magazine layout.

8. The method of claim 1, wherein the filtering and channelization options include a content source filter.

9. A computing device comprising:

a processor; and a computer-readable storage medium comprising one or more programming instructions that are configured to cause the processor to:

receive a text string from a user of a media presentation application as a search term, send the search term to a content aggregation server, receive search results from a search term search executed by the content aggregation server the search results containing social network content from social network accounts of the user, content aggregation channel content from one or more existing content channels of the media presentation application associated with the user, and search engine result content, where the social network content, content aggregation content and search engine content are derived from the search team, present the search results to the user, present one or more filtering and channelization options, receive a filtering and channelization option configuration from the user based on the filtering and channelization options, apply the received filtering and channelization option configuration to the search results to identify a set of final content, format the set of final content into a template, record the filtering and channelization option configuration as a new content channel that includes the set of final content, present the new content channel to the user as a new page of the media presentation application that includes the set of final content formatted into the template, wherein each of the one or more existing content channels of the user are presented as different pages of the media presentation application; and update the final content by requesting re-execution of the search term search by the content aggregation server and re-applying the filtering and channelization option configuration to results of re-executing the search term in response to a user access of the new content channel.

10. The computing device of claim 9, wherein the social network content, content aggregation channel content, and search engine result content include articles, images and video.

11. The computing device of claim 9, wherein the filtering and channelization options include content type filters, subject matter filters, keyword filters, time filters and channel filters.

12. The computing device of claim 9, wherein the computer-readable storage medium contains additional instructions that are configured to cause the processor to remove content from the search results defined by the filtering and channelization options.

13. The computing device of claim 9, wherein the computer-readable storage medium contains additional instructions that are configured to cause the processor to format the search results into a magazine layout using images to represent each content item in the magazine layout, where the images are derived from each content item.

14. The computing device of claim 13, wherein each content item is sorted by age, marked or read status and relevance for ordering in the magazine layout.

* * * * *